Nov. 3, 1931.  D. C. PECK  1,830,674
LUBRICATING APPARATUS
Filed Sept. 13, 1929
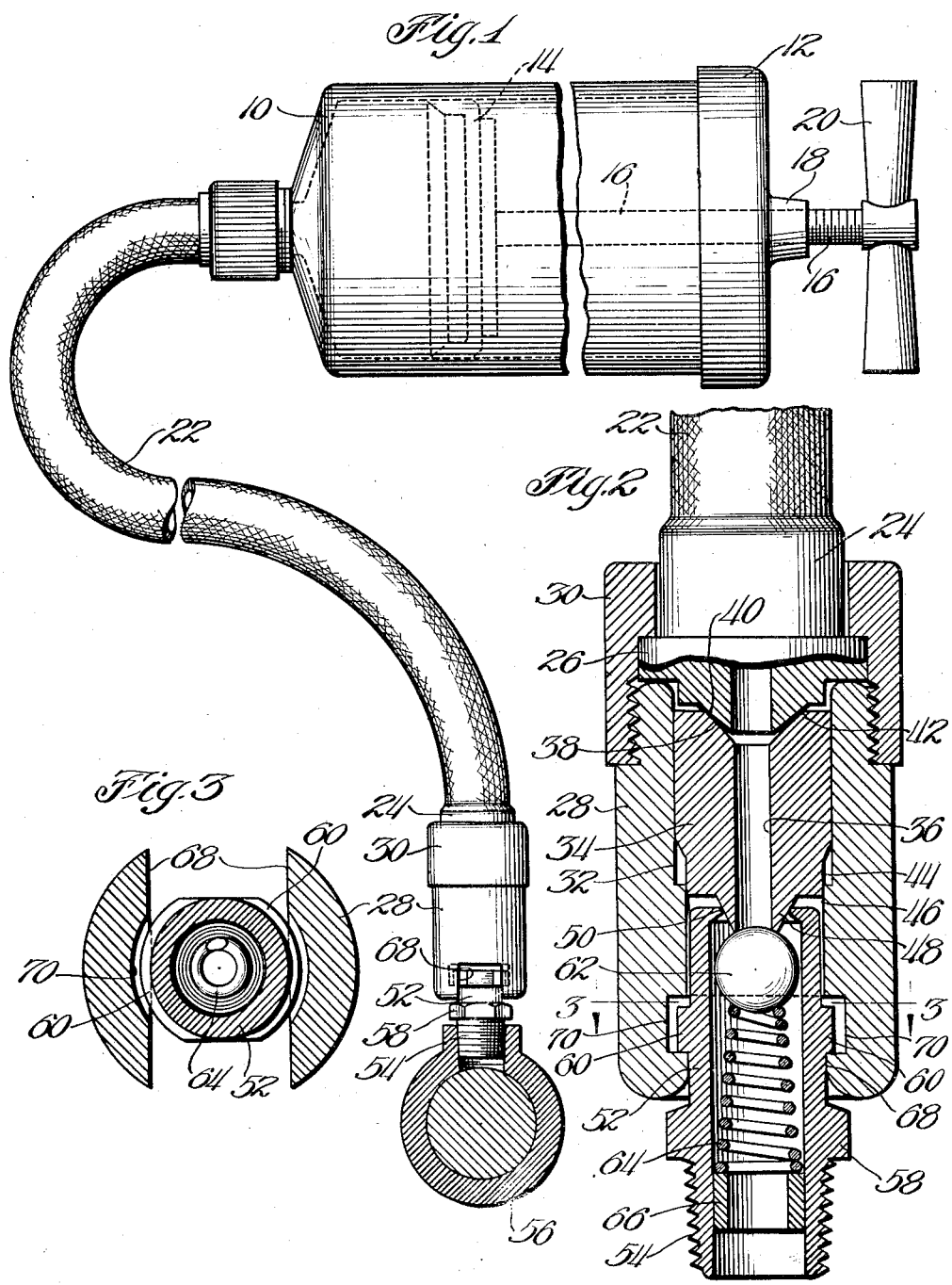

Patented Nov. 3, 1931

1,830,674

UNITED STATES PATENT OFFICE

DON C. PECK, OF PLAINVILLE, CONNECTICUT, ASSIGNOR TO ALEMITE CORPORATION, OF CHICAGO, ILLINOIS, A CORPORATION OF DELAWARE

LUBRICATING APPARATUS

Application filed September 13, 1929. Serial No. 392,288.

My invention relates generally to lubricating apparatus and more particularly to a coupler for making a detachable connection between a lubricant compressor and a lubricant receiving fitting associated with the bearing to be lubricated. Lubricating systems of the type in which the coupling of my invention is adapted to be used are well known in the art and generally comprise lubricant receiving fittings semi-permanently attached to the bearings of a machine to be lubricated, a lubricant compressor having a flexible or jointed discharge conduit, and a coupler at the end of the conduit having means for successively making a detachable sealed connection with the fittings.

It is an object of my invention to provide an improved coupler for use in a system of the above-mentioned type in which a simplified means is used to effect a lubricant-tight connection with a fitting.

A further object is to provide an improved coupler of the above-mentioned type in which a simplified form of swivel is utilized.

A further object is to provide a coupling for a lubricating system of the above-mentioned type which is exceedingly simple in construction, may be economically manufactured, and which is effective in operation.

Other objects will appear from the following description, reference being had to the accompanying drawings, in which Fig. 1 is an elevation of a lubricant compressor, discharge conduit, coupler and lubricant receiving fitting, the latter being shown secured to a bearing shown in section;

Fig. 2 is a central vertical section of a connected coupler and lubricant receiving fitting; and Fig. 3 is a horizontal section of the connected coupler and lubricant receiving fitting taken on the line 3—3 of Fig. 2.

The compressor shown in Fig. 1 is of conventional construction and comprises a barrel 10 having a cap 12 secured thereto. A cup leather piston 14 is suitably secured to a piston rod 16 which is threaded in a boss 18 formed on the cap 12 and which at its extremity has a handle 20. A flexible conduit 22 is secured to the discharge end of the barrel 10 and at its extremity has a swivel member 24.

The member 24 has an annular flange 26 which is rotatably secured to the end of a coupling sleeve 28 by a collar 30. The sleeve 28 has a central bore 32 in the upper portion thereof in which a sealing member 34 is slidable. The member 34 has a central grease conducting bore 36, the upper end of which flares outwardly to form a substantially conical recess 38 which is adapted to receive a frusto-conical projection 40 formed on the swivel member 24. The angles of the surface of the flared recess 38 and the surface of the frusto-conical projection 40 are slightly different so that when these two members are forced together they will contact in a circular line at 42.

The lower end of the member 34 has a cylindrical portion 44 of reduced diameter which is slidable in a bore 46 formed in the lower end of the coupling sleeve 28. This portion 44 has a projection 48 which is adapted to project into the lubricant receiving opening 50 formed in the lubricant receiving fitting 52, the projection 48 having a substantially conical external surface which will make sealing contact with the edge of the fitting 52 about the opening 50.

The fitting 52 comprises a substantially tubular member having a screw threaded portion 54 adapted to be threaded into the oil hole of a bearing 56, a hexagonal wrench engaging portion 58 and a pair of flanges 60. A ball closure 62 is normally held against a suitable seat formed at the opening 50 by a compression coil spring 64, the lower end of which rests upon a tubular shaped seat 66 which is pressed into the bore of the fitting.

The lower end of the coupling sleeve 28 has a diametrically milled slot 68, the width of which is slightly greater than the diameter of the upper portion of the fitting 52, and has a pair of diametrically opposite recesses 70 conformed to receive the flanges 60 of the fitting.

In operation, the coupling sleeve 28 is axially thrust over the fitting 52, the flanges 60 passing upwardly through the lower end of the slot 68 until the recesses 70 are in alignment with the flanges 60, whereupon the sleeve 28 is rotated to cause the flanges to rest within the recesses. This rotative movement of the sleeve 28 is possible without rotating the conduit 22 due to the swivel connection of the conduit with the sleeve. As the coupling connection is made the projection 48 enters the opening 50 of the fitting and makes a sealing connection between the member 34 and the fitting.

The member 44 is also forced tightly up against the swivel member 24 forming a seal at the line 42. A lubricant-tight passageway is thus completed from the swivel member to the fitting.

The coupling having been effected, lubricant is supplied to the fitting by operation of the compressor, rotating the handle 20 relative to the barrel 10 to advance the piston 14, thereby expressing the lubricant before the piston through the conduit 22 to the fitting. Lubricant will of course force the ball closure 62 away from the end of the passageway 36 to permit passage of the lubricant.

After sufficient lubricant has been forced into the bearing to be lubricated, the coupling is disconnected from the fitting by rotating it through an angle of approximately ninety degrees in either direction to bring the flanges 60 of the fitting in line with the slot 68, whereupon the coupler may be moved axially to remove it from the fitting.

In some instances, due to slight variations in the manufacture of the fittings 52, or because of enlargement of the openings 50 in the fitting, the member 34 will not be forced rigidly against the swivel member 24 to form a sealing connection in the line 42. This, however, will not materially affect the operation of the coupler since the lubricant pressure above the member 34 will force the latter downwardly into firm contact with the end of the fitting and since the member 34 and its projection 44 have a close sliding fit in the bores 32 and 46, respectively, lubricant cannot escape from the coupling except through the fitting.

The sealing member 34, as previously stated, has a relatively close sliding fit in the bore 32 and has a relatively long cylindrical surface in contact with the bore so that even if there is a small clearance between the member 34 and the walls of the sleeve 28 the resistance to flow of lubricant will be so great that there will be no appreciable leakage past the member. Furthermore, the projection 44 fitting closely in the bore 46 forms an additional means for checking the flow of any lubricant which may have escaped past the enlarged portion of the member 34.

By making the lower horizontal surfaces of the recesses 70 of slightly helical conformation, the coupling sleeve will be drawn toward the fitting slightly as it is rotated to complete the coupling connection and thereby cause the member 34 to be tightly held between the end of the fitting and the swivel member 40, to assure sealing at the line 42 as well as at the edge of the opening 50 in the fitting. However, under ordinary circumstances, where the fit between the member 34 and the bore in which it is slidable may be maintained close by accurately manufacturing these parts, it is unnecessary to provide the above-described additional means for assuring effective sealing of the coupler.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a high pressure coupling for making a detachable connection with a lubricant receiving fitting, the combination of an axially bored sleeve, a sealing member reciprocable in said sleeve, a swivel member rotatably secured at one end of said sleeve and having means for making a line sealing contact with said sealing member, means on said sleeve for making a quick detachable mechanical connection with a lubricant receiving fitting, and means projecting from the end of said sealing member for protrusion into the opening of the lubricant receiving fitting and for contacting with the edge of the opening of the fitting.

2. In a high pressure coupling for making a detachable connection with a lubricant receiving fitting, the combination of a sleeve having two coaxial bores of different diameters, a sealing member reciprocable in the larger of said bores and having a portion extending into the smaller bore, a swivel member rotatably secured at one end of said sleeve, means on said sleeve for making a mechanical connection with a lubricant receiving fitting, and conically surfaced means projecting from the end of said portion of the sealing member in said smaller bore for engagement in the opening of the lubricant receiving fitting and for contacting with the edge of the opening of the fitting.

3. A coupling connector for high pressure lubricating apparatus comprising a sleeve, a swivel member for connecting one end of said sleeve to a lubricant discharge conduit, said sleeve having communicating coaxial bores of different diameters, a transverse slot at the other end of said sleeve, and recesses undercut in the sleeve adjacent said slot; a sealing member having portions fitting closely in each of said bores and being slidable therein, means for making a line sealing contact between said sealing member and said swivel member and a projection on the end of said sealing member for making lubricant tight connection by protrusion into the opening of a lubricant receiving fitting and contacting with the edge of said opening.

4. A coupling for high pressure lubricating apparatus comprising a sleeve having portions of the bore thereof of different diameters, a sealing part having parts thereof of different diameters complemental to the bore of said sleeve, said sealing part having a frusto conical edge for making a line contact with said sleeve said sleeve having a diametrical slot substantially the width of the smaller portion of the bore in said sleeve, opposite internal recesses in said sleeve and a lubricant receiving fitting comprising a substantially tubular body having a pair of flanges adapted to engage in said recesses when said coupling sleeve is rotated relative to said fitting, and a spring pressed ball valve closing the opening in one end of said body, said opening being adapted to receive and its edge adapted firmly to engage said sealing part.

In witness whereof, I hereunto subscribe my name this 6 day of September, 1929.

DON C. PECK.